United States Patent [19]

Butcher et al.

[11] Patent Number: 4,769,301

[45] Date of Patent: Sep. 6, 1988

[54] METHOD OF PREPARING HOLOGRAMS AND THE HOLOGRAMS PREPARED THEREBY

[75] Inventors: David W. Butcher, Goostrey; John L. Cawse, Bollington, both of England

[73] Assignee: Ciba-Geigy AG, Basle, Switzerland

[21] Appl. No.: 940,049

[22] Filed: Dec. 10, 1986

[30] Foreign Application Priority Data

Dec. 11, 1985 [GB] United Kingdom ............... 8530460

[51] Int. Cl.$^4$ ............................................. G03H 1/04
[52] U.S. Cl. ......................................... 430/2; 430/1; 430/642
[58] Field of Search ................................ 430/1, 2, 642

[56] References Cited

U.S. PATENT DOCUMENTS

| | | | |
|---|---|---|---|
| 3,963,490 | 6/1976 | Graube | 430/2 |
| 3,971,664 | 7/1976 | Nakazawa et al. | 430/2 |
| 4,025,345 | 5/1977 | Kido et al. | 430/1 |
| 4,029,507 | 6/1977 | Wehner et al. | 430/2 X |
| 4,032,348 | 6/1977 | Kido et al. | 430/1 |
| 4,173,474 | 11/1979 | Tanaka et al. | 430/306 X |
| 4,201,441 | 5/1980 | Matsumoto et al. | 430/2 X |
| 4,510,221 | 4/1985 | Gorin et al. | 430/2 X |
| 4,588,664 | 5/1986 | Fielding et al. | 430/331 X |

OTHER PUBLICATIONS

J. W. Gladden, Review of Photosensitive Materials for Halographic Recordings, Technical Report, U.S. Army Engineer Topographic Laboratories, Fort Belvoir, Va. 22060, #ETL-0128, Apr. 1978.

L. H. Lin, Halogen Formation in Hardened Dichromated Gelatin Films, Applied Optics, vol. 8, No. 5, 963–966, May 1969.

*Primary Examiner*—Mukund J. Shah
*Attorney, Agent, or Firm*—Wenderoth, Lind & Ponack

[57] ABSTRACT

Holograms using gelatin as the binders are prepared by holographically exposing holographic material with coherent light, developing the holographic image by a chemical or physical process and before processing, simultaneously or subsequently, treating the material with an aqueous solution of a polymer which comprises a tertiary amine group.

6 Claims, No Drawings

METHOD OF PREPARING HOLOGRAMS AND THE HOLOGRAMS PREPARED THEREBY

The present invention relates to holograms and to their production.

In theory a hologram will replay using white light reconstruction, at about the wavelength of the coherent light which was used in the exposure to prepare it. However, in practice during the processing of holographic material there is usually some shrinkage of the gelatin binder and this causes, in general, the replay wavelength to be shorter than the wavelength of the laser used in the exposure of the material.

Nevertheless sometimes it is desired that the replay wavelength is longer than the wavelength of the laser used in exposing the material. This is because lasers are expensive and it is desirable that the replay wavelength can be increased to produce a different colour reply hologram using only one laser. Further a He:Ne laser is fairly inexpensive and this emits at 633 nm. However, if it is required to copy holograms prepared using a He:Ne laser it is more efficient to do so using a pulsed ruby laser which emits at 694 nm. Thus it is desirable that a hologram which was made using a He:Ne laser can replay at 694 nm rather than at 633 nm or less.

In the past some attempt has been made to obtain this bathochromic shift in replay wavelength by treating the hologram with tanning developers such as pyrogallol or inorganic gelatin hardening agents such as aluminium salts, but the results have not be satisfactory. Further it has been found imposible to achieve a bathochromic shift to a desired replay wavelength in a reproducible manner.

Other attempts have been made using organic swelling agents such as triethanolamine, but the effect produced by such agents is not permanent, probably due to the volatility of such swelling agents.

We have found a method of preparing a hologram in which the binder is gelatin which exhibits a permanent and reducible bathochromic shift in the replay wavelength.

Therefore according to the present invention there is provided a method of preparing a hologram which uses gelatin as the binder which method comprises holographically exposing the holographic material by use of coherent light, developing the holographic image by a chemical process or a physical process and before processing, simultaneously or subsequently, treating the material with an aqueous solution of a polymer which comprises a tertiary amine group either in the repeating unit or in a side chain.

A class of suitable water-soluble polymers of particular use in the method of the present invention are polymers formed by reacting methylene bisacrylamide or substituted derivatives thereof with a compound which comprises two secondary amine groups.

Examples of useful compounds which comprise two secondary amine groups are: piperazine, 4,4'bipiperidine, 4,4'-ethylene dipiperidine, 2,5-dimethyl-piperazine and N,N'-dimethylethylene diamine.

An example of a substituted methylene bisacrylamide is the compound of the formula I:

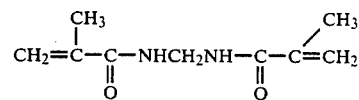

The following preparation will serve to illustrate the preparation of a polymer of the structure:

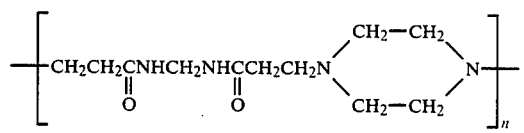

where n is at least 10.

This polymer is hereinafter referred to as polymer A. This polymer is an example of a useful polymer which comprises a tertiary amine group in the repeating unit.

Examples of polymers which comprise a tertiary amino group in a side chain are polymers which have a repeating unit of the general formula II:

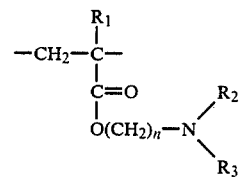

where $R_1$ is hydrogen or a methyl group, $R_2$ and $R_3$ are each selected from optionally substituted alkyl, aralkyl or aryl groups and n is 2–4 or $R_2$ and $R_3$ represent the atoms necessary to complete a saturated heterocyclic ring. Preferably $R_2$ and $R_3$ are each methyl or ethyl. Polymers which comprise the repeating unit of formula II may be homopolymers or copolymers.

Examples of polymers which comprise a repeating unit of formula II are poly(dimethylaminoethylmethacrylate) and poly(morpholino ethyl methacrylate).

Preferably an aqueous solution which comprises from 0.2 to 20 g of the polymer per 100 ml of water is used to treat the holographic material.

The usual processing sequence for a silver halide sensitised hologram is silver halide development using a silver halide developing agent for example hydroquinone, followed by a silver bleaching process.

The silver bleaching step may be any process of removing the developed silver, but which leaves the unexposed silver halide in situ. It is to be understood that the developed silver may be converted to silver halide some of which may remain in the holographic material.

Examples of bleaching techniques are solvent bleaching methods in which the developed silver is removed from the material and rehalogenating bleaching methods, in which the developed silver is converted to silver halide.

After the holographic exposure the material may be treated with an aqueous solution of the polymer before development or the polymer may be present in the silver halide developing solution or in a stop bath between silver halide development and bleaching or in the bleach path or in a bath in which the material is treated after bleaching.

The bathochromic shift observed does not seem to be greatly affected by the position in the processing sequence in which the material is treated with an aqueous bath of the polymer. However, it is often convenient to treat the material with an aqueous bath of the polymer after the bleach bath.

If the material is washed subsequent to the treatment bath comprising the polymer often some initial lessening in the bathochromic shift effect is observed, but this lessening does not increase substantially if the material is washed for a longer time.

The bathochromic shift was found to be independent of the duration of holographic exposure. This is unlike the effect observed when using a tanning developer such as pyrogallol to achieve a bathochromic shift.

The following examples will serve to illustrate the invention.

EXAMPLE 1

Samples of holographic material were prepared by coating onto a transparent photographic film base a gelatino silver halide emulsion which was substantially pure silver bromide having a mean crystal size of 0.03 microns at a silver coating weight of 30 mg/dm$^2$. The emulsion was optically sensitised with a red sensitising dye so that it was optimally sensitive to 633 n.m. the colour of a He:Ne laser.

The material was holographically exposed by a Denisyuk exposure method using a brushed aluminium plate as an object to yield (after processing) a reflective hologram.

The material was then developed for 2 minutes in a solution of the following formulation:

Sodium Sulphite Anhydrous: 30 g
Hydroquinone: 10 g
Sodium Carbonate: 60 g
Water to 1000 ml The samples were then transferred to rehalogenating bleach bath of the following composition:

Fe(NH$_4$)EDTA(1.8 m Solution): 150 ml
KBr: 20 g
Water to 1000 ml until all silver metal had been bleached out which was about 2 minutes.

The sample were then water washed in running water for 1 minute and transferred to aqueous bath which consisted of a 10% by weight solution of polymers A to D as hereinafter set forth for 5 minutes. The temperature of these solutions was as set forth in Table 1.

Preparation of methylene bisacrylamide/piperazine polymer A as hereinbefore formulated and similar polymers B, C and D.

PREPARATION OF POLYMER A 15.42 g (0.10 mol) recrystallised methylene bisacrylamide (MBA) and 8.62 (0.10 mol) anhydrous piperazine each dissolved in 15 ml water were mixed together and stirred 5 hours at 40°–50° C. The viscous, colourless solution was cooled to room temperature, poured into acetone, allowed to stand for 16 hours then filtered, washed with acetone and dried in vacuum at 40° to yield 22.5 g (94%) of white powder (polymer A).

Polymers B, C and D were prepared in similar manner but adjusting the quantities of MBA and piperazine so that in polymer B the molar ratio of piperazine to MBA was 0.9 to 1, in polymer C the molar ratio of piperazine to MBA was 0.7 to 1 and in polymer D the molar ratio of piperazine to MBA was 0.5 to 1.

TABLE 1

| Aqueous Soltuion | Temp °C. | Exposure (Seconds) | Replay λ(nm) | Final Water Wash (mins) | Bathochromic shift λ(nm) |
|---|---|---|---|---|---|
| Control | | 0.5 | 566 | | |
| Polymer A | 20 | 0.5 | 716 | 10 | 150 |
| Polymer B | 20 | 0.5 | 690 | 10 | 124 |
| Polymer C | 20 | 0.5 | 678 | 10 | 112 |
| Polymer D | 20 | 0.5 | 637 | 10 | 66 |

An exposure of 0.5 seconds in the apparatus used is equivalent to an energy expenditure of 750 µJ.

EXAMPLE II

Preparation of poly(morpholinoethyl methacrylate) which is an example of a polymer which comprises a tertiary amino group in a side chain as shown in formula II as hereinbefore set forth. This polymer is hereinafter referred to as polymer E.

Morpholinoethyl methacrylate (intermediate I) was prepared by transesterification of methyl methacrylate* using n-(2-hydroxyethyl morpholine) with titanium tetrabutoxide as catalyst. I, 15 g was then polymerised using azo-bisisobutyronitrile (0.30 g) as initiator in 35 g industrial methylated spirit at 70° C. for 16 hours under nitrogen. The mixture was cooled to room temperature and the resultant gum which separated was washed with petroleum spirit and dried in vacuo to yield a brittle, colourless polymer E (13 g, 87% conversion), soluble in cold water.

*Rèf: Functional monomers (Vol. 2) ed. R. H. Yocum and E. B. Nyquist Marcel Dekker, N.Y. 1974, Chapter 3.

Samples of holographic material were prepared and processed as in Example 1 up to and including the rehalogenating bleach bath step.

The samples were then water washed in running water for one minute and transferred to an aqueous bath which consisted of 0.5% solution of polymer E at 40° C. as shown in the table below.

| | Time of soaking in aqueous bath of polymer E | replay λ(nm) |
|---|---|---|
| Control | 0 | 579 |
| Polymer E | 2 minutes | 610 |
| Polymer E | 5 minutes | 638 |
| Polymer E | 10 minutes | 646 |

What is claimed is:

1. A method of preparing a hologram which uses gelatin as the binder which method comprises holographically exposing the holographic material by use of coherent light, developing the holographic image by a chemical or physical process and before processing, simultaneously or subsequently, treating the material with an aqueous solution of a polymer which comprises a tertiary amino group in the repeating unit, said polymer being formed by reacting methylene bisacrylamide or a substituted derivative thereof with a compound which comprises two secondary amino groups, or which polymer comprises a tertiary amino in a side claim and which comprises repeating units of the formula

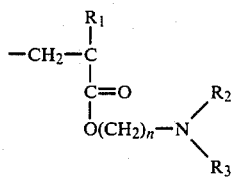

where $R_1$ is hydrogen or a methyl group, $R_2$ and $R_3$ are each methyl or ethyl and n is 2–4 or $R_2$ and $R_3$ represent the atoms necessary to complete a saturated heterocyclic ring.

2. A method according to claim 1 wherein the compound which comprises two secondary amino groups is piperazine, 4,4′-bipiperidine, 4,4′-ethylene dipiperidine, 2,5-dimethyl-piperazine or N,N′-dimethylethylene diamine.

3. A method according to claim 2 wherein the polymer has the repeating unit of the formula:

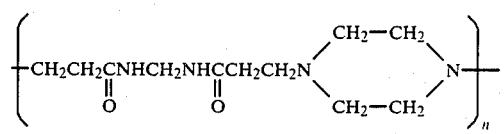

where n is at least 10.

4. A method according to claim 1 wherein the polymer is poly(dimethylamino ethyl methacrylate) or poly(morpholino ethyl methacrylate).

5. A method according to claim 1 wherein the hologram is of the silver halide in gelatin binder type and wherein after the holographic exposure the holographic material is treated with an aqueous solution of the polymer before development or the polymer compound may be present in the silver halide developing solution or in a stop bath between silver halide development and bleaching or in the bleach bath or in a bath in which the material is treated after bleaching.

6. A hologram prepared by the method according to claim 1.

* * * * *